Nov. 2, 1948.    W. B. HOLDRIDGE    2,452,757
LATHE RADII ATTACHMENT
Filed Sept. 10, 1945

INVENTOR.
Warren B. Holdridge
BY Carlos G. Stratton
ATTORNEY

Patented Nov. 2, 1948

2,452,757

UNITED STATES PATENT OFFICE 2,452,757

LATHE RADII ATTACHMENT

Warren B. Holdridge, Los Angeles, Calif.

Application September 10, 1945, Serial No. 615,300

2 Claims. (Cl. 82—12)

My invention relates to a lathe radii attachment that can be used on a lathe or mill. It is preferably attached to the compound of a lathe, and an object of the invention is to provide a radii attachment that can be manually operated for cutting spheres and the like.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figure 1:
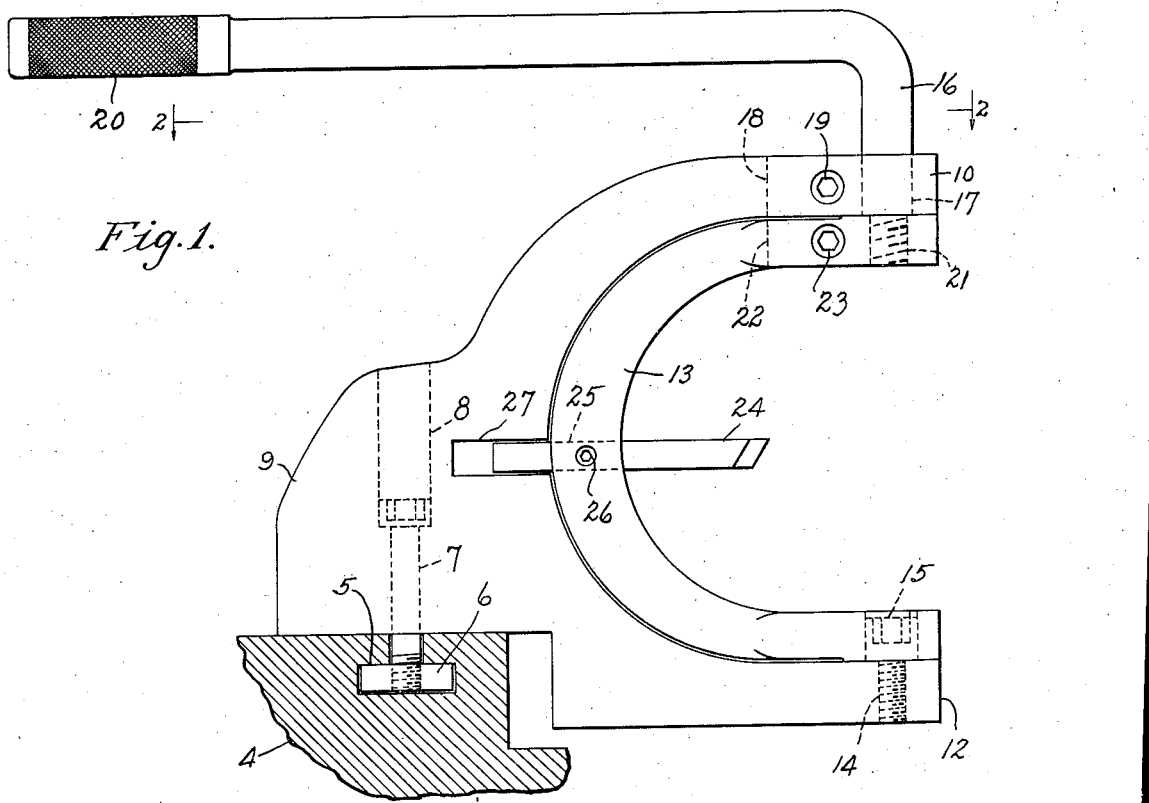
Fig. 1 is a side elevational view of such a radii attachment.
Figure 2:
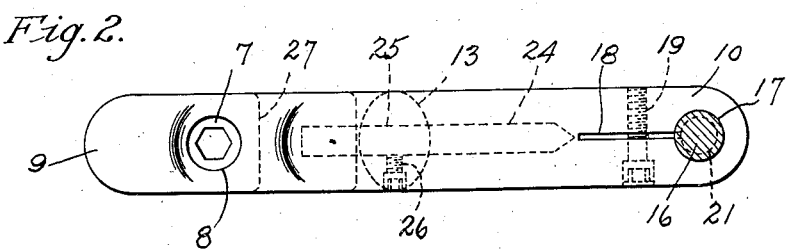
Fig. 2 is a section on the line 2—2 of Fig. 1.

Referring more in detail to the drawings, the reference number 4 indicates a portion of a compound of a lathe, which is shown broken away. An inverted T-shaped slot 5 provides a way in which a nut 6 may be slid laterally. A bolt 7 is screwed into the nut 6.

The bolt 7 is inserted in a countersink 8 in a body 9 of the attachment. The bolt 7 may be an Allen screw, as suggested in the drawings.

The body 9 is bifurcated to provide two parallel arms 10 and 12, one of which overhangs the other in a C-shaped arrangement. A swinging tool support 13 is likewise C-shaped in elevation and has its peripheral contour conforming with the inner face of the body 9. An Allen screw 14 is screwed in the lower arm 12. The round, smooth exterior of the head 15 permits the support 13 to swing in a circle around the axis of the screw 13.

At the top, the support 13 is pivoted on the upper arm 10 by a crank 16 that extends through a circular bore 17 at the end of a split 18 in the arm 10. The split 18 and bore 17 are intermediate the ends of the arm 10. In other words, the split 18 does not extend to the outer end of the arm 10. An Allen screw 19 pinches together the opposite sides of the slot 18, to clamp the crank 16 within the bore 17. A suitable, knurled handle 20 is provided at the outer end of the crank 16, for manipulation thereof. The inner end of the crank 16 is reduced and threaded, as suggested at 21. It is screwed into a correspondingly tapped bore in the support 13. The axes of the crank 16, the reduced end 21 thereof, the head 15 and the screw 14 are in alinement, so as to permit the support 13 to swing around such combined axis.

The upper arm of the C-shaped support 13 has a slot 22 that coincides with the slot 18 except that the slot 22 is slightly longer since it extends to the reduced bore 21. An Allen screw 23 is employed to pinch together the sides of the slot 22, whereby to pinch together the opposite walls of the threaded bore in order to grip the reduced end 21 of the crank.

A tool bit 24 is slidable in an angular bore 25 in the swinging support 13. A set screw 26 holds the tool bit 24 in its adjusted positions. A recess 27 in the body 9 receives the rear end of the tool bit 24, and permits the tool bit to move therethrough in a horizontal plane, as shown in the drawings.

In the use of my attachment, the body 9 is first clamped upon the compound of a lathe or mill by sliding the nut 6 laterally in the undercut slot 5 therein. The bolt 7 is thereupon employed to fasten the body 9 to the compound by cooperation with the nut 6.

The screw 19 is loosened sufficiently to permit the conjunctive swinging movements of the crank 16 and support 13. The arm 10 provides a bearing for the crank 16. By swinging the crank handle 20 manually, the tool bit 24 is swung in an arc around the combined axis of the screw 14 and the reduced end 21 of the crank. Thereby the tool bit may be employed to cut a sphere, or part thereof, in work material (not shown). When it is desired to hold the support 13 and thereby the tool bit in a fixed position, the screw 19 is tightened, clamping the crank 16 against swinging movement.

I have provided suitable means whereby the relative position of the handle 20 may be changed, to wit, by loosening the screw 23 and turning the support 13 or handle 20 relative to one another and then re-tightening the screw 23.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A radii attachment for lathes and like machines comprising a generally C-shaped frame formed with vertically spaced parallel arms and with an intermediate projection extending in a direction opposite to the arms, said projection having a hole therethrough for a securing bolt engaged with a support for adjustably fastening the attachment to said support, the lower of said arms being provided with a screw-tapped seat and the upper arm with a smooth bore aligned with said seat, said upper arm, also, having a vertical through slot extending from the smooth bore inwardly of the upper arm and a transverse screw-receiving hole having internal screw threads in said upper arm on one side of said slot, a transverse screw in said latter hole for effecting contraction of the slot and, therefore, of the smooth bore, a tool-holding C-shaped member having a nesting position in the C-shaped frame and formed with vertically spaced parallel arms generally coextensive with the arms of the frame, the lower arm of the tool-holding member having a bore aligned with the threaded seat of the lower arm of the frame, a lower pivot screw having a cylindrical head in the latter bore and its threaded shank in said seat, the upper arm of the tool-holding member having an internally threaded hole and a vertical connecting slot aligned with the smooth bore and connecting slot in the upper arm of the frame, a transverse screw similar to the above-mentioned transverse screw in said upper arm of the tool-holding member for effecting contraction of the slot and internally threaded hole, and a handle having a threaded end in said internally threaded hole and extending through the aligned smooth bore to form an upper pivot aligned with the lower pivot screw, whereby swinging movement of the handle will cause swinging movement of the tool-holding frame on its pivots, and whereby contraction of said smooth bore to frictionally grip the handle will lock the tool-holding member against movement.

2. A radii attachment for lathes and like machines comprising a generally C-shaped frame formed with vertically spaced parallel arms and with an intermediate projection extending in a direction opposite to the arms, said projection having a hole therethrough for a securing bolt engaged with a support for adjustably fastening the attachment to said support, the lower of said arms being provided with a screw-tapped seat and the upper arm with a smooth bore aligned with said seat, said upper arm, also, having a vertical through slot extending from the smooth bore inwardly of the upper arm and a transverse screw-receiving hole having internal screw threads in said upper arm on one side of said slot, a transverse screw in said latter hole for effecting contraction of the slot, and therefore, of the smooth bore, a tool-holding C-shaped member having a nesting position on the C-shaped frame and formed with vertically spaced parallel arms generally coextensive with the arms of the frame, the lower arm of the tool-holding member having a bore aligned with the threaded seat of the lower arm of the frame, a lower pivot screw having a cylindrical head in the latter bore and its threaded shank in said seat, the upper arm of the tool-holding member having an internally threaded hole and a vertical connecting slot aligned with the smooth bore and connecting slot in the upper arm of the frame, a transverse screw similar to the above-mentioned transverse screw in said upper arm of the tool-holding member for effecting contraction of the slot and internally threaded hole, said C-shaped member having a passage intermediate its arms and parallel thereto, a tool adjustably held in said passage and extending through the body of said member, a lateral set-screw in said body for adjustably locking said tool in place, and a handle having a threaded end in said internally threaded hole and extending through the aligned smooth bore to form an upper pivot aligned with the lower pivot screw, whereby swinging movement of the handle will cause swinging movement of the tool-holding frame on its pivots, and whereby contraction of said smooth bore to frictionally grip the handle will lock the tool-holding member against movement.

WARREN B. HOLDRIDGE.

REFERENCES CITED

The following references are of record in the file of this patent:

UNITED STATES PATENTS

| Number | Name | Date |
|---|---|---|
| 2,295,014 | Schmuldt | Sept. 8, 1942 |
| 2,389,197 | Keller | Nov. 20, 1945 |